(12) United States Patent
Park

(10) Patent No.: US 6,412,797 B1
(45) Date of Patent: Jul. 2, 2002

(54) FRONT WHEEL SUSPENSION SYSTEM FOR A VEHICLE

(75) Inventor: Young-Wook Park, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/640,468

(22) Filed: Aug. 16, 2000

(30) Foreign Application Priority Data

Nov. 9, 1999 (KR) .............................................. 99-49404

(51) Int. Cl.$^7$ ................................................. B60G 7/00
(52) U.S. Cl. ........................ 280/124.125; 280/124.13; 280/124.134; 280/124.135; 280/124.136; 280/124.138; 280/124.139; 280/124.141; 280/124.145; 280/124.148; 280/124.149; 267/249; 267/254
(58) Field of Search ...................... 280/124.13, 124.135, 280/124.134, 124.138, 124.136, 124.139, 124.141, 124.145, 124.148, 124.149; 267/254, 249

(56) References Cited

U.S. PATENT DOCUMENTS

| | | | |
|---|---|---|---|
| 3,827,711 A | * | 8/1974 | Muller ............. 280/124.125 X |
| 4,693,491 A | * | 9/1987 | Akatsu et al. ...... 280/124.13 X |
| 4,875,703 A | * | 10/1989 | Murakami ......... 280/124.13 X |
| 5,080,388 A | * | 1/1992 | Berry et al. ...... 280/124.135 X |
| 5,217,245 A | * | 6/1993 | Guy ............................ 280/689 |
| 5,782,484 A | * | 7/1998 | Kurn ................ 280/124.135 X |
| 6,007,079 A | * | 12/1999 | Kincaid .................. 280/124.13 |
| 6,076,840 A | * | 6/2000 | Kincaid et al. ... 280/124.135 X |
| 6,161,853 A | * | 12/2000 | Jung ................ 280/124.135 X |
| 6,254,114 B1 | * | 7/2001 | Pulling .................. 280/124.13 |

FOREIGN PATENT DOCUMENTS

| | | | | |
|---|---|---|---|---|
| DE | 0486337 | * | 10/1991 | ........ 280/124.13 X |
| DE | 4242815 | * | 12/1992 | ........ 280/124.13 X |

* cited by examiner

Primary Examiner—Lanna Mai
Assistant Examiner—Toan To
(74) Attorney, Agent, or Firm—Christie, Parker & Hale, LLP

(57) ABSTRACT

A front wheel suspension system for a vehicle includes a wheel carrier for supporting a wheel, an upper control arm for mounting to an upper end of the wheel carrier, a lower control arm for mounting to a lower end of the wheel carrier, and a strut assembly for mounting on the lower control arm to absorb up-and-down impacts transmitted from the wheel, the strut assembly being inclined in a direction and designed to apply damping force to the lower control arm when the vehicle wheel bumps. A device is provided to generate a reacting force acting against the damping force of the strut assembly, the reacting force being applied to the lower control arm to compensate for the damping force.

6 Claims, 3 Drawing Sheets

FRONT WHEEL SUSPENSION SYSTEM FOR A VEHICLE

BACKGROUND OF THE INVENTION (a) Field of the Invention

The present invention relates to a front wheel suspension system for a vehicle.

(b) Description of the Related Art

Generally, a steerable wheel suspension system connects an axle and a vehicle body to each other, and absorbs vibrations and impacts from a road surface while the vehicle is being driven, to enhance safety and ride comfort.

To absorb impacts, the vehicle suspension system is connected flexibly in a vertical direction. To endure driving force, braking force and centrifugal force generated from the wheels, the suspension system is connected firmly in a horizontal direction.

As is well known, the suspension system includes a shock absorber disposed between, for example, a lower link and an upper link or a vehicle body.

When a vehicle is in a turn, if the shock absorber is located insuitably, damping force of the shock absorber acts in a direction where a toe-in of outer wheels with respect to a turning direction is increased, resulting in an oversteer phenomenon. Particularly, such an oversteer phenomenon caused by the damping force of the shock absorber is more serious in the case of a double-wishbone type suspension system in which a lower control arm is separated in order to have an imaginary moving center, deteriorating handling performance of the vehicle.

SUMMARY OF THE INVENTION

Therefore, the present invention has been made in an effort to solve the above-described problem.

It is an objective of the present invention to provide a front wheel suspension system that can prevent an oversteer phenomenon during the turning of a vehicle.

To achieve the above objective, the present invention provides a front wheel suspension system for a vehicle including a wheel carrier for supporting a wheel, an upper control arm for mounting to an upper end of the wheel carrier, separated lower control arms for mounting to a lower end of the wheel carrier, and a strut assembly for mounting on one of separated lower control arms to absorb up-and-down impacts transmitted from the wheel, the strut assembly being inclined in a direction and designed to apply damping force to one of the separated lower control arms when the vehicle bumps, wherein a device is provided to generate reacting force acting against the damping force of the strut assembly, the reacting force being applied to one of the separated lower control arm to compensate for the oversteer effect by the damping force.

Preferably, the device for generating reacting force comprises a connecting rod for mounting on the lower control link, and a stabilizer bar one end of which is coupled to a top of the connecting rod, the connecting rod being inclined in a direction opposite to that in which the strut assembly is inclined, the stabilizer bar functioning as an anti-roll device for the vehicle.

BRIEF DESCRIPTION OF THE DRAWINGS

The accompanying drawings, which are incorporated in and constitute a part of the specification, illustrate embodiments of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
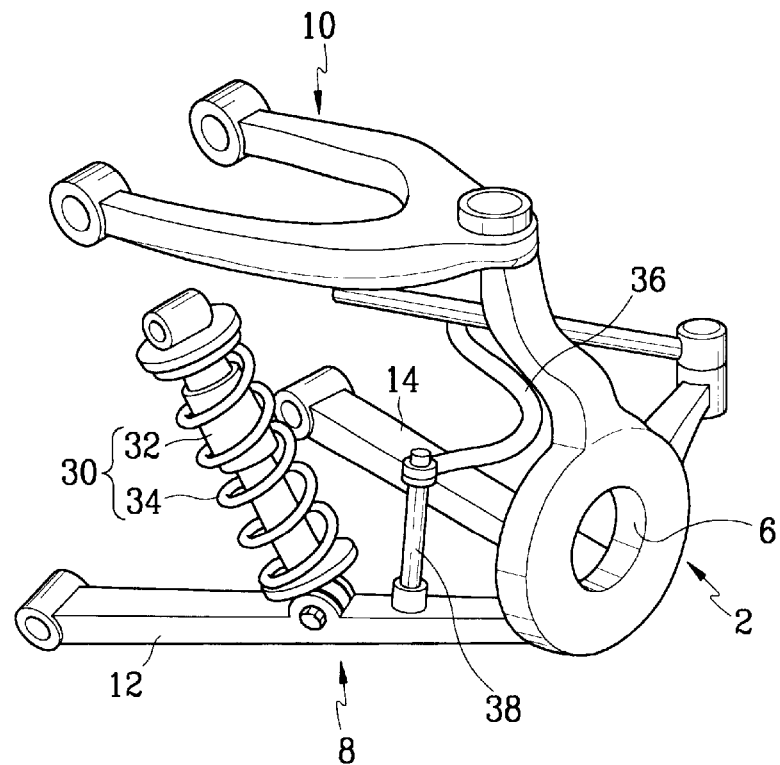
FIG. 1 is a perspective view of a front wheel suspension system according to a preferred embodiment of the present invention.
Figure 2:
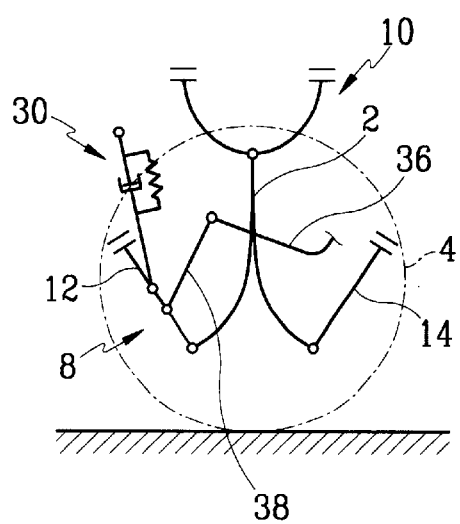
FIG. 2 is a schematic side view of a front wheel suspension system according to a preferred embodiment of the present invention.

FIGS. 1 and 2 show a front wheel suspension system according to a preferred embodiment of the present invention.

The inventive suspension system comprises a wheel carrier 2 rotatably supporting a wheel 4. The wheel carrier 2 is provided with an axle hole 6 in which a spindle (not shown) is mounted. The suspension system further comprises an upper control arm 10 for connecting a vehicle body (not shown) to an upper end of the wheel carrier 2, and a lower control arm 8 for connecting the vehicle body to the wheel carrier 2. The lower control arm 8 includes front and rear control links 12 and 14.

The suspension system further comprises a strut assembly 30 having a shock absorber 32 and a spring 34. The strut assembly 30 is disposed between the front lower link 12 and the vehicle body to absorb up-and-down impacts transmitted from the wheel. The strut assembly 30 is inclined to a front side of the vehicle body.

A connecting rod 38 is mounted on the front lower link 12 and inclined to a rear side of the vehicle body. One end of a stabilizer bar 36 used as an anti-roll device is fixed on a top of the connecting rod 38.

Figure 3:
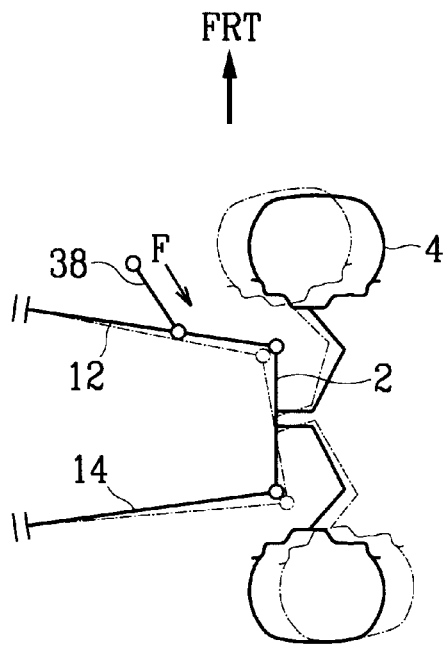
FIG. 3 is a top view of a front wheel suspension system illustrating a posture variation of a front wheel according to an operation of a shock absorber.

As the strut assembly 30 is inclined to the front side of the vehicle body, when the wheel 4 bumps during the vehicle's turn, as shown in a phantom line of FIG. 3, the suspension system is displaced rearward by damping force F of the strut assembly 30 applied to the front lower link 12. This causes the wheel 4 to be displaced in a toe-in state.

When the wheel 4 is displaced in the toe-in state, oversteer occurs during the vehicle's turn.

Therefore, the connecting rod 38 inclined to the rear side of the vehicle and the fixing of one end of the stabilizer bar 36 to the connecting rod 38 function as a reacting force generating means acting against the damping force of the strut assembly 30 to prevent the wheel from displacing into the toe-in state when the vehicle is in a turn.

The stabilizer bar 36 is disposed such that it can apply a rotational moment to the wheel 4, the rotational moment being identical in magnitude to correct the oversteer phenomenon by the strut assembly 30.

Figure 4:
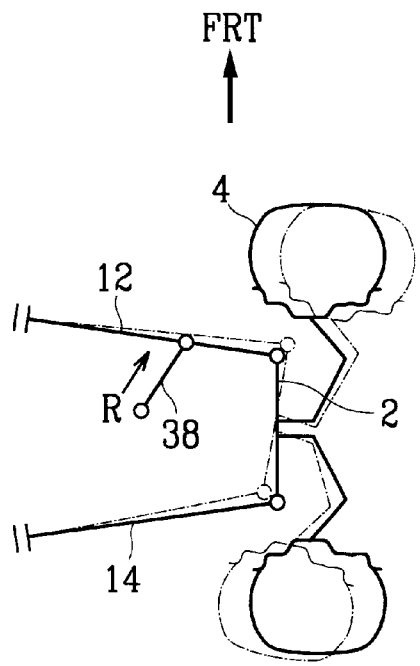
FIG. 4 is a top view illustrating an operation of a front wheel suspension system illustrating a posture variation of a front wheel according to an operation of a reaction element.

That is, as shown in FIG. 4, when the wheel 4 bumps during the vehicle's turn, a reacting force R of the stabilizer bar 38 is applied to the front lower link 12 through the connecting rod 38 inclined to the rear side of the vehicle. As a result, as shown in the phantom line of FIG. 4, the suspension system is displaced frontward, leading the wheel to a toe-out state.

Figure 5:
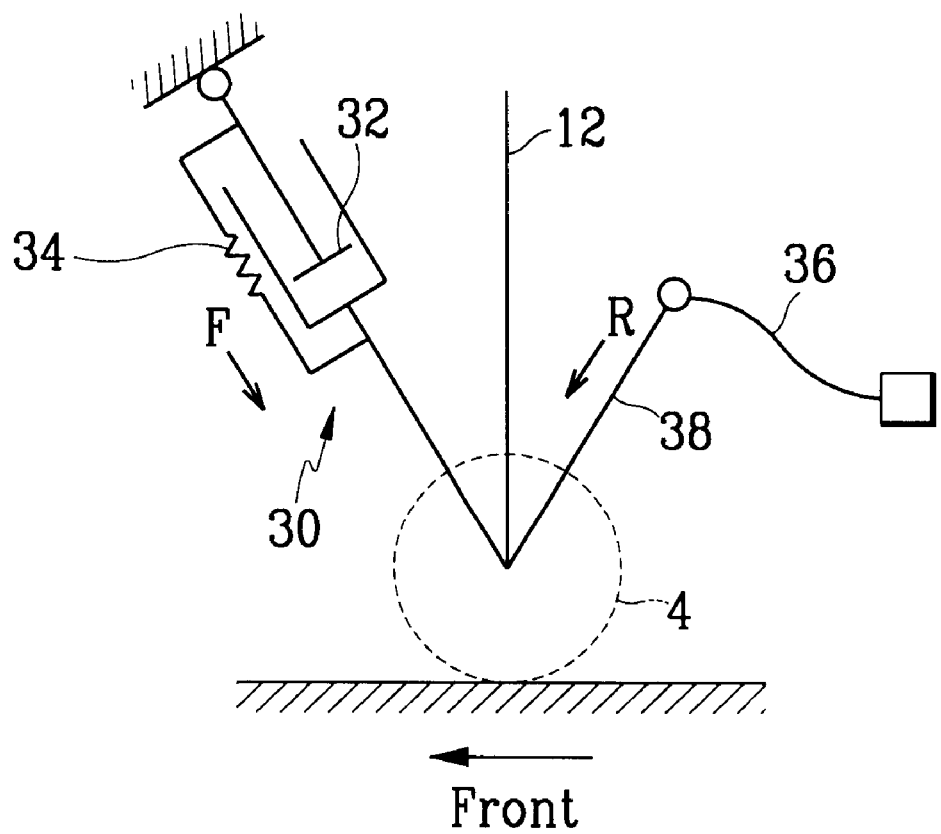
FIG. 5 is a schematic view of an operation of a front wheel suspension system according to a preferred embodiment of the present invention.

Accordingly, as shown in FIG. 5, the damping force F of the strut assembly 30 and the reacting force R of the stabilizer bar 36 compensate foreach other. As a result, the lower control link 12 is not displaced to have a toe-in state.

That is, the rotation moment of the wheel which is applied by the strut assembly compensates for the rotation moment of the wheel which is applied by the stabilizer bar. Not much toe variation is generated, thereby preventing oversteer during the vehicle's turn.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A front wheel suspension system for a vehicle, comprising:
   a wheel carrier for supporting a wheel;
   an upper control arm mounted to an upper portion of the wheel carrier;
   a lower control arm mounted to a lower portion of the wheel carrier;
   a strut assembly mounted on the lower control arm to absorb up-and-down impacts transmitted from the wheel, the strut assembly is inclined from vertical in a direction and applies a damping force to the lower control arm when the vehicle wheel bumps;
   a connecting rod mounted on the lower control arm; and
   a stabilizer bar coupled to the connecting rod, the connecting rod being inclined from vertical in a direction opposite to that in which the strut assembly is inclined, the stabilizer bar functioning as an anti-roll device for the vehicle, wherein the connecting rod generates a reacting force against the lower control arm in response to the damping force compensating for the damping force and preventing an oversteer phenomenon caused by the damping force.

2. A suspension system as recited in claim 1 wherein one of said strut assembly and connecting rod is inclined toward a front end of the vehicle and wherein the other of said strut assembly and connecting rod is inclined toward a rear end of the vehicle.

3. A suspension system as recited in claim 1 wherein the strut assembly is inclined toward a front end of the vehicle and wherein the connecting rod is inclined toward a rear end of the vehicle.

4. A suspension system as recited in claim 1 wherein the lower control arm comprises a front link closer to a front end of the vehicle and a rear link closer to a rear end of the vehicle, wherein the strut assembly and connecting rod are both mounted on the front link of the lower arm.

5. A suspension system as recited in claim 4 wherein one of said strut assembly and connecting rod is inclined toward a front end of the vehicle and wherein the other of said strut assembly and connecting rod is inclined toward a rear end of the vehicle.

6. A suspension system as recited in claim 4 wherein the strut assembly is inclined toward the front end of the vehicle and wherein the connecting rod is inclined toward the rear end of the vehicle.

* * * * *